United States Patent
Lin et al.

(10) Patent No.: US 11,594,974 B2
(45) Date of Patent: Feb. 28, 2023

(54) POWER CONVERSION DEVICE AND POWER SUPPLY SYSTEM

(71) Applicant: DELTA ELECTRONICS, INC., Taoyuan (TW)

(72) Inventors: Wang-Che Lin, Taoyuan (TW); Miao-Jen Cheng, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 51 days.

(21) Appl. No.: 17/037,597

(22) Filed: Sep. 29, 2020

(65) Prior Publication Data

US 2021/0367524 A1    Nov. 25, 2021

(30) Foreign Application Priority Data

May 19, 2020 (CN) .......................... 202010424257.5

(51) Int. Cl.
*H02M 3/335* (2006.01)
*H02M 1/00* (2006.01)

(52) U.S. Cl.
CPC ...... *H02M 3/33576* (2013.01); *H02M 1/0009* (2021.05)

(58) Field of Classification Search
CPC .......... H02M 3/33576; H02M 1/0009; H02M 1/007; H02M 3/33584; H02M 3/285; H02M 3/33507; H02M 1/0093; H02M 3/3353; H02M 3/33561
See application file for complete search history.

(56) References Cited

U.S. PATENT DOCUMENTS

| 10,320,304 | B2* | 6/2019 | Chen ...................... H02M 1/32 |
| 11,228,247 | B2* | 1/2022 | Higaki .................. H02M 3/285 |
| 2007/0159865 | A1 | 7/2007 | Iwamoto et al. |
| 2018/0342955 | A1 | 11/2018 | Tsai |

FOREIGN PATENT DOCUMENTS

| CN | 102447396 A | 5/2012 |
| CN | 105934056 A | 9/2016 |
| CN | 109245539 A | 1/2019 |
| CN | 208739029 U | 4/2019 |
| JP | H0870573 A | 3/1996 |
| WO | 2015110427 A1 | 7/2015 |

* cited by examiner

*Primary Examiner* — Kyle J Moody
(74) *Attorney, Agent, or Firm* — CKC & Partners Co., LLC

(57) ABSTRACT

A power conversion device includes a power supply, a converter, a current detection circuit, and a control circuit. The power supply includes positive and negative terminals. The converter includes a primary side and a secondary side. The converter is configured to output a first current to a load. The primary side is electrically connected to the positive terminal and the negative terminal of the power supply in parallel. The secondary side is electrically connected to the positive terminal of the power supply and the load in series. The current detection circuit is coupled between the secondary side and the load, and is configured to detect the first current to output a current detection signal. The control circuit is coupled to the current detection circuit for outputting a control signal to the converter according to the current detection signal and a reference current signal.

20 Claims, 8 Drawing Sheets

POWER CONVERSION DEVICE AND POWER SUPPLY SYSTEM

RELATED APPLICATION

The present application claims priority to China Application Serial Number 202010424257.5, filed May 19, 2020, which is incorporated herein by reference in its entirety.

BACKGROUND

Technical Field

The present disclosure relates to a power conversion device and a power supply system, and particularly to a power conversion device using a transformer and a power supply system including a plurality of power conversion devices.

Description of Related Art

When multiple batteries are used in parallel, due to the different internal resistance, capacity and aging of each battery, the output current of each battery cannot achieve current sharing, and the discharge time will be limited by one of these batteries having the lowest capacity.

Generally speaking, in order to achieve current sharing, a DC converter will be connected to the output of each battery, and the output current will be made unified by controlling the output voltage. However, in order to achieve high-power discharge, the component specification requirements of the DC converter are high, the system size is large, the conversion efficiency is low, and it is easily overheated.

Therefore, how to maintain current sharing and solve the above problems is one of the important issues in the field.

SUMMARY

An aspect of this disclosure relates to a power conversion device. The power conversion device is configured to provide an output voltage to a load, and includes a power supply and a converter. The power supply is configured to provide a first voltage. The converter includes a switch and a transformer, and the transformer includes a primary winding and a secondary winding. The primary winding is connected to the switch in series and configured to receive the first voltage, wherein the primary winding and the switch are connected with the power supply in parallel. The secondary winding is connected with the power supply and the load in series. The switch is configured to switch according to the control signal, so that the secondary winding generates a second voltage according to the voltage of the primary winding. The output voltage is provided based on the first voltage and the second voltage.

Another aspect of this disclosure relates to a power supply system. The power supply system includes a plurality of power conversion devices for providing output voltage and output current to the load. Each of the power conversion devices includes a power supply, a converter, and a control circuit. The power supply is configured to output the first voltage. The converter includes a switch and a transformer, and the transformer includes a primary winding and a secondary winding. The primary winding is connected to the switch in series and configured to receive the first voltage, wherein the primary winding and the switch are connected with the power supply in parallel. The secondary winding is connected with the power supply and the load in series. The switch is configured to switch according to the control signal, so that the secondary winding generates a second voltage according to the voltage of the primary winding. The control circuit is configured for generating the control signal according to a current detection signal and a reference current signal corresponding to the output current, so as to control the switch to adjust the second voltage, so that the output voltages of the plurality of power conversion devices are equal.

In summary, by electrically connecting the DC power supply to the secondary winding of the transformer, the transformer only needs to convert the voltage difference between the supply voltage of the DC power supply and the target output voltage, which can reduce the cost of the components and the size of the finished product, improve conversion efficiency, reduce overheating problems, and effectively extend the overall discharge time.

It is to be understood that both the foregoing general description and the following detailed description are by examples, and are intended to provide further explanation of the invention as claimed.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content. Certain terms configured to describe the disclosure are discussed below or elsewhere in this specification to provide additional guidance to those skilled in the art in the description of the disclosure.

In addition, the terms "including", "comprising", "having", "containing" and the like, as used herein, are all open-ended terms, meaning "including but not limited to".

Further, "and/or" as used herein includes any one or combination of one or more of the associated listed items.

As used herein, when an element is referred to as "connected" or "coupled", it may mean "electrically connected" or "electrically coupled". "Connected" or "coupled" can also be configured to indicate that two or more components operate or interact with each other. In addition, although the terms "first", "second", etc. are used herein to describe different elements, the terms are only configured to distinguish elements or operations described in the same technical terms. Unless clearly indicated in the context, the use of the term is not specifically intended or implied, and is not intended to limit the invention.

Figure 1:
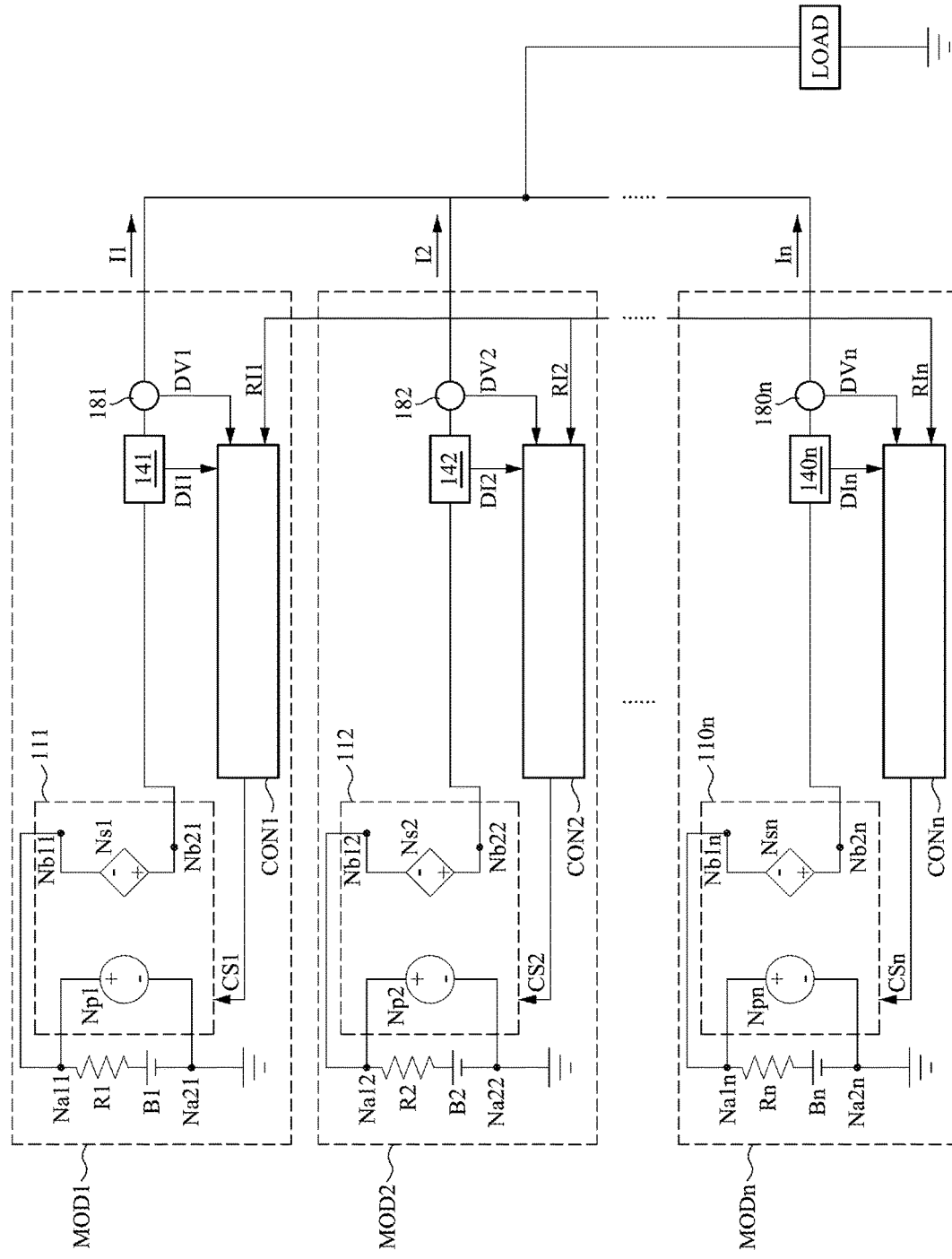
FIG. 1 is a schematic diagram of a power supply system according to some embodiments of the present disclosure.

Reference is made to FIG. 1. FIG. 1 is a schematic diagram of a power supply system 100a according to some embodiments of the present disclosure. As shown in FIG. 1, the power supply system 100a includes a plurality of power conversion devices MOD1-MODn. The power conversion devices MOD1-MODn are connected in parallel with each other, and are all electrically connected to the load LOAD, and provide output currents to the load LOAD respectively.

As shown in FIG. 1, the power conversion device MOD1 includes a power supply B1, a converter 111, a current detection circuit 141, a voltage detection circuit 181, and a control circuit CON1. The power supply B1 includes a positive terminal and a negative terminal. The converter 111 includes a primary side Np1 and a secondary side Ns1. In some embodiments, the power supply B1 may be a DC power supply and implemented by a battery, but the present application is not limited thereto. In this embodiment, the converters 111-110n are configured to provide positive voltage compensation for the output voltages of the respective power conversion devices MOD1-MODn. For the specific circuit architecture, refer to FIG. 2A.

Structurally, the positive terminal of the power supply B1 is connected to the node Na11 through the resistor R1, and the negative terminal of the power supply B1 is connected to the node Na21 and grounded. The first terminal of the primary side Np1 is connected to the node Na11, and the second terminal of the primary side Np1 is connected to the node Na21. In other words, the primary side Np1 is connected in parallel to the power supply B1. The first terminal of the secondary side Ns1 is connected to the node Nb11, and the second terminal of the secondary side Ns1 is connected to the node Nb21. In other words, the secondary side Ns1 is connected with the power supply B1 and the load LOAD in series. Both the current detection circuit 141 and the voltage detection circuit 181 are connected between the node Nb21 and the load LOAD.

In operation, the primary side Np1 of the converter 111 is configured to receive a first voltage, and the secondary side Ns1 is configured to generate a second voltage according to the voltage of the primary side Np1. Since the secondary side Ns1 of the converter 111 is connected in series to the power supply B1, the first voltage of the power supply B1 superposes the second voltage generated by the secondary side of the converter 111 as the output voltage to collectively supply the current to the load LOAD. The current detection circuit 141 is configured to detect the first current I1 (i.e., output current) output by the output terminal (i.e., node Nb21) of the secondary side Ns1 to generate the current detection signal DI1 to the control circuit CON1. The voltage detection circuit 181 is configured to detect the voltage (i.e., output voltage) of the output terminal (i.e., node Nb21) of the secondary side Ns1 to generate the voltage detection signal DV1 to the control circuit CON1. The control circuit CON1 is configured to receive the current detection signal DI1, the reference current signal RI1 and the voltage detection signal DV1 and provide the control signal CS1 to the converter 111 according to the aforementioned signals it receives. The converter 111 is configured to receive and operate according to the control signal CS1.

In addition, the power conversion devices MOD2 to MODn are similar to the structure of the power conversion device MOD1 and will not be repeated here.

The value of the reference current signal RI1-RIn is the average value of the first currents I1-In. In other words, the control circuits CON1-CONn average the first currents I1-In output by each of the converters 111-110n, and then transmit the average current value to each control circuit CON1-CONn. In this way, each power conversion device MOD1-MODn uses the average current value as a reference to control the first currents I1-In outputted by them, so as to achieve the purpose of current sharing. At the same time, the output voltages provided by the power conversion devices MOD1-MODn to the load LOAD are caused to be the same.

In some embodiments, the control circuits CON1-CONn may be implemented by various processing circuits, digital signal processors (DSPs), complex programmable logic devices (CPLDs), field programmable gate arrays (FPGA) or any other ways.

Generally speaking, if the output voltage to be generated is 10 volts and the first voltage output by the DC power supply is 8 volts, the converter of the conventional power conversion device needs to convert 8 volts to 10 volts through a switch. However, since the power supplies B1-Bn in the present embodiment are directly connected in series with the secondary sides Ns1-Ns of the converters 111-110n, the second voltage generated by the secondary sides Ns1-Ns together with the first voltage of the DC power supplies B1-Bn are superposed as the output voltage. Therefore, it is only necessary to control the converters 111-110n to generate a second voltage of 2 volts (rather than 10 volts), and the output voltage can still reach 10 volts.

In this way, since the converters 111-110n only need to convert the voltage difference between the first voltage and the target output voltage, the requirements of device specifications of the converters 111-110n are lower, which can reduce the cost, reduce the size of the finished product, and achieve higher conversion efficiency, and thus can reduce the overheating problems.

Figure 2A:
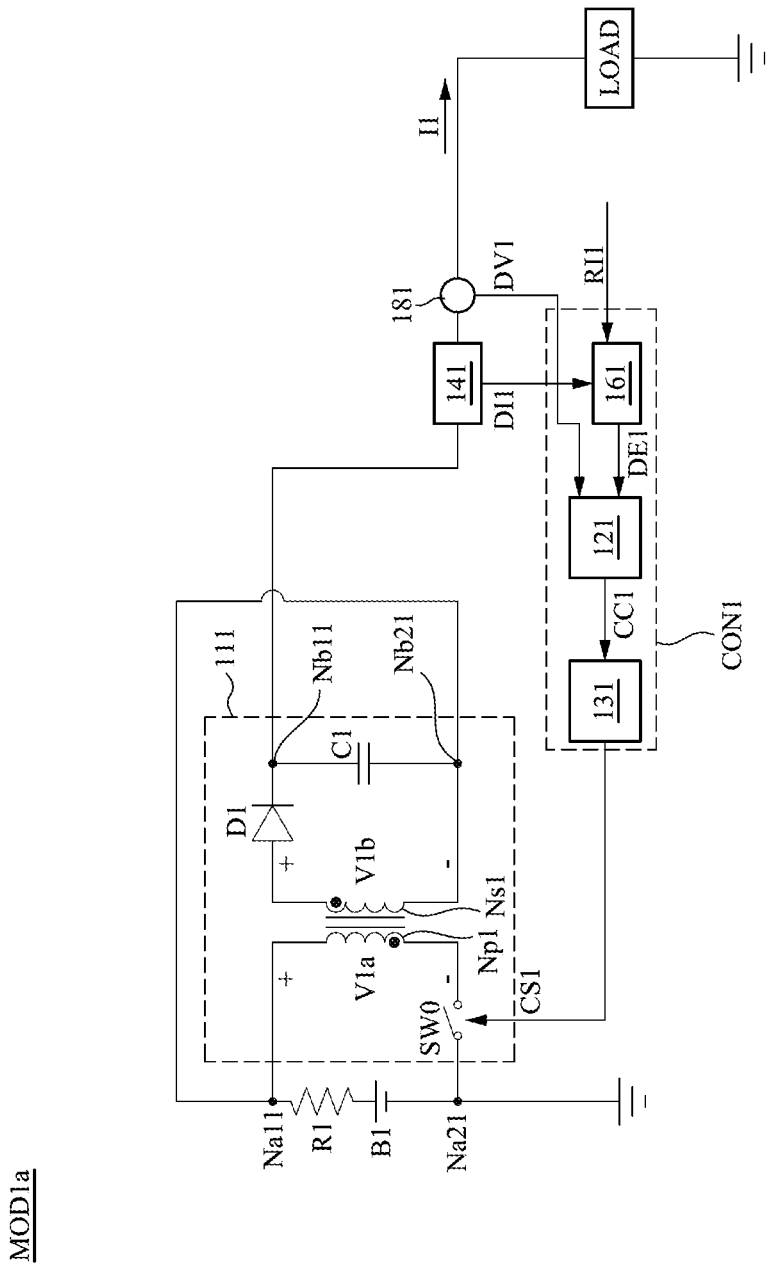
FIG. 2A is a schematic circuit diagram of a power conversion device according to an embodiment of FIG. 1.

For further details, please refer to FIG. 2A. FIG. 2A is a schematic circuit diagram of the power conversion device MOD1 according to an embodiment of FIG. 1. Since the connections and operations of each of the power conversion devices MOD1-MODn are similar, for simplicity of description, FIG. 2A will take the power conversion device MOD1 as an example for description. In other words, the power conversion devices MOD2-MODn in FIG. 1 can be implemented based on the power conversion devices MOD1a in FIG. 2A.

As shown in FIG. 2A, in some embodiments, the converter 111 may be implemented by a flyback converter, but the present application is not necessarily limited thereto. In other words, those skilled in the art can implement other conversion circuits including transformers according to actual needs, such as forward converters, push-pull converters, etc.

In this embodiment, converter 111 includes a transformer (including primary winding Np1 and secondary winding Ns1), switch SW0, diode D1 and capacitor C1. Structurally, the first terminal of the primary winding Np1 is connected to the node Na11. The second terminal of the primary winding Np1 is connected to the node Na21 through the switch SW0. The first terminal of the secondary winding Ns1 is connected to the anode end of the diode D1. The cathode terminal of the diode D1 is connected to the load LOAD through the node Nb11. The second terminal of the secondary winding Ns1 is connected to the node Na11 (that is, the positive terminal of the power supply B1) via the node Nb21. The capacitor C1 is connected between the node Nb11 and the node Nb21.

In operation, the switch SW0 receives the control signal CS1 and switches according to the control signal CS1 to adjust the second voltage on the secondary winding Ns1. In this embodiment, the negative potential of the second voltage is at the node Nb21 and the secondary winding Ns1 is connected to the power supply B1 in series via the nodes Nb21 and Na11, so that the second voltage can be used as a positive voltage compensation for the output voltage. In other words, the output voltage provided by the power conversion device MOD1a can be greater than or equal to the first voltage provided by the power supply B1, and the control circuit CON1 can adjust the second voltage by the control signal CS1 so that the output voltage reaches the target voltage required by the load LOAD.

In addition, as shown in FIG. 2A, the control circuit CON1 includes a current sharing loop 161, a compensator 121, and a controller 131. Structurally, the current sharing circuit 161 is coupled to the current sharing circuit of the current detection circuit 141 and other power conversion devices. The compensator 121 is coupled to the voltage detection circuit 181 and the current sharing circuit 161. The controller 131 is coupled to the compensator 121 and the switch SW0.

In operation, the current sharing circuit 161 is configured to receive the current detection signal DI1 and the reference current signal RI1, and generates a current difference DE1 according to the current detection signal DI1 and the reference current signal RI1. The compensator 121 is configured to receive the voltage detection signal DV1 and the current difference DE1, and generates a compensation signal CC1 according to the voltage detection signal DV1 and the current difference DE1 to output the compensation signal CC1 to the controller 131. The controller 131 is configured to receive the compensation signal CC1 and generate a control signal CS1 according to the compensation signal CC1. In some embodiments, the control signal CS1 is a pulse width modulation signal (PWM).

For example, when the current detection signal DI1 is greater than the reference current signal RI1, the compensator 121 generates a negative compensation signal CC1 according to the current difference DE1 greater than zero, so that the controller 131 adjusts the duty cycle of the signal CS1 according to the negative compensation signal CC1, to reduce the first current I1 (that is, the output current) and the voltage of the secondary winding Ns1 (that is, the second voltage). Conversely, when the current detection signal DI1 is less than the reference current signal RI1, the compensator 121 generates a positive compensation signal CC1 according to the current difference DE1 less than zero, so that the controller 131 raises the duty cycle of the control signal CS1 according to the positive compensation signal CC1 to increase the first current I1 and the second voltage.

Figure 3A:
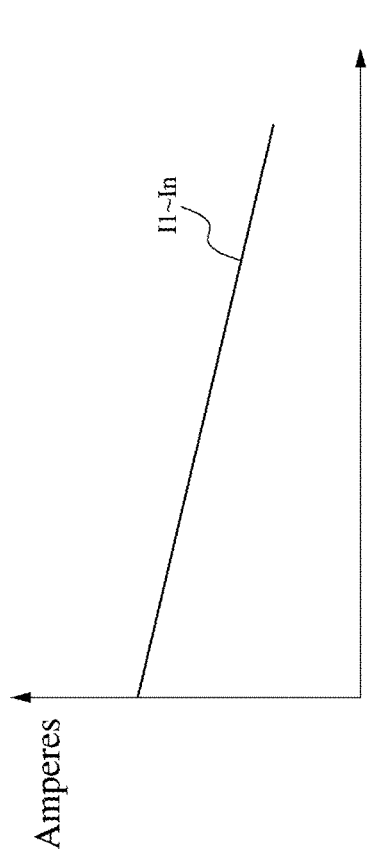
FIG. 3A is a schematic diagram illustrating the output current of a power supply system according to some embodiments of the present disclosure.
Figure 3B:
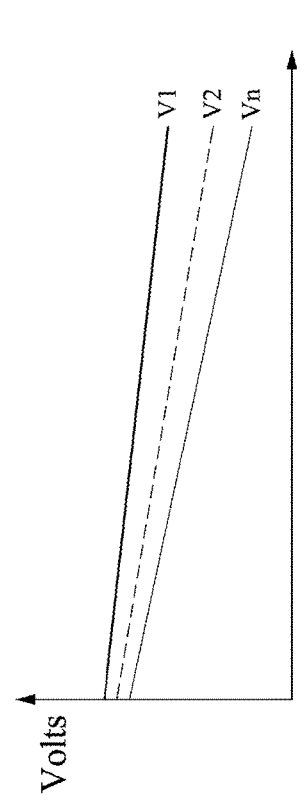
FIG. 3B is a schematic diagram illustrating the voltage of a DC power supply of a power supply system according to some embodiments of the present disclosure.
Figure 3C:
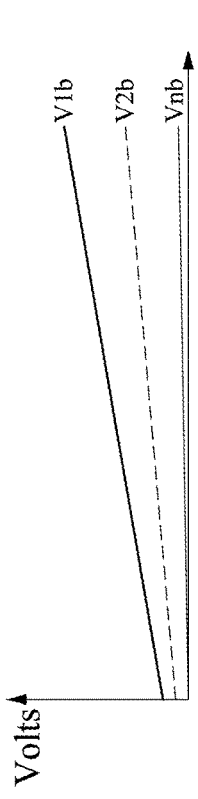
FIG. 3C is a schematic diagram illustrating the inductive voltage of a power supply system according to some embodiments of the present disclosure.

In addition, as shown in FIGS. 3B and 3C, when the first voltages V1-Vn decrease with increasing discharge time, the second voltage (i.e., the voltage V1b-Vnb) will increase as the discharge time increases, to maintain the output voltage. For example, if the target voltage is 10 volts, when the first voltage Vn of the power supply Bn is 8 volts, the second voltage Vnb needs to be 2 volts. When the first voltage Vn of the power supply Bn decreases to 6 volts as the discharge time increases, the second voltage Vnb needs to be increased to 4 volts. In other words, as the discharge time increases, the control circuits CON1-CONn can adjust the duty cycle of the control signal to control the first currents I1-In and the output voltage.

In this way, with each power conversion device MOD1-MODn detecting the respective first currents I1-In and the output voltages, and performing compensation and regulation through the respective control circuits CON1-CONn, the first currents I1-In remain consistent with each other, as shown in FIG. 3A.

Figure 2B:
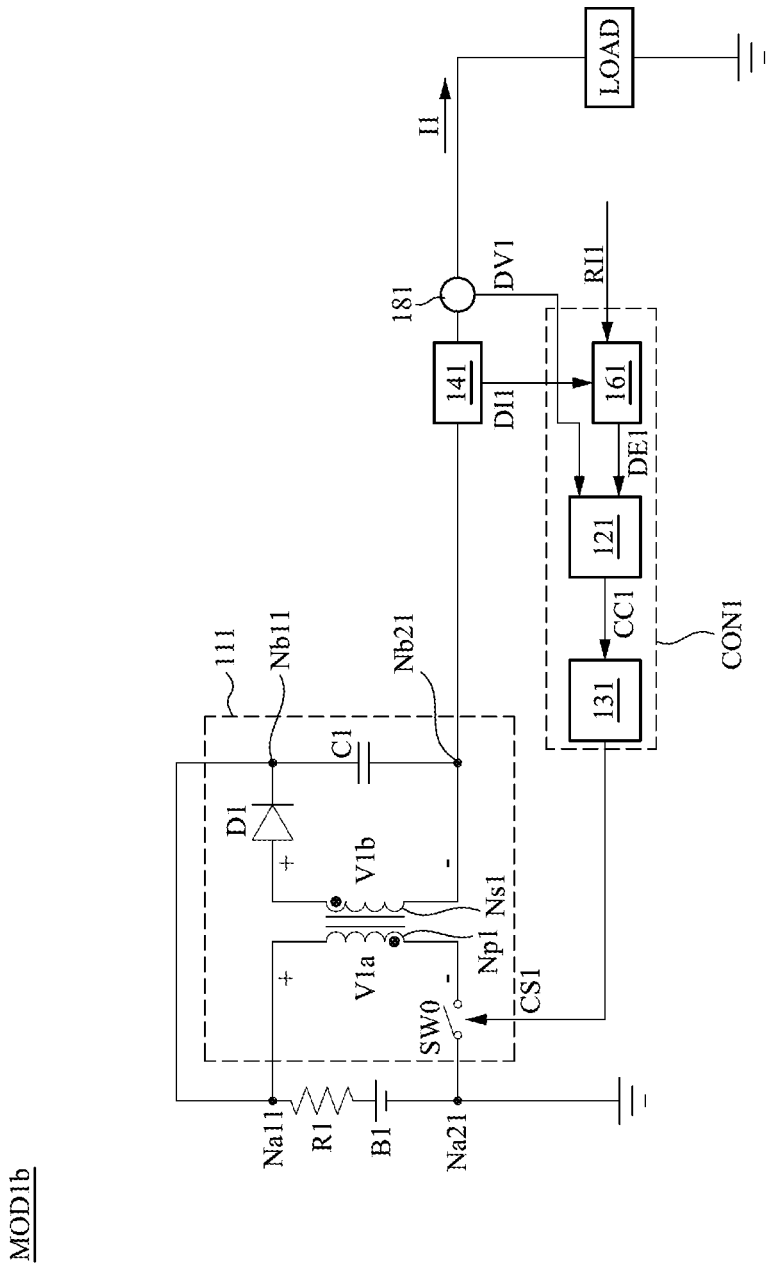
FIG. 2B is a schematic circuit diagram of a power conversion device according to another embodiment of FIG. 1.
Figure 4:
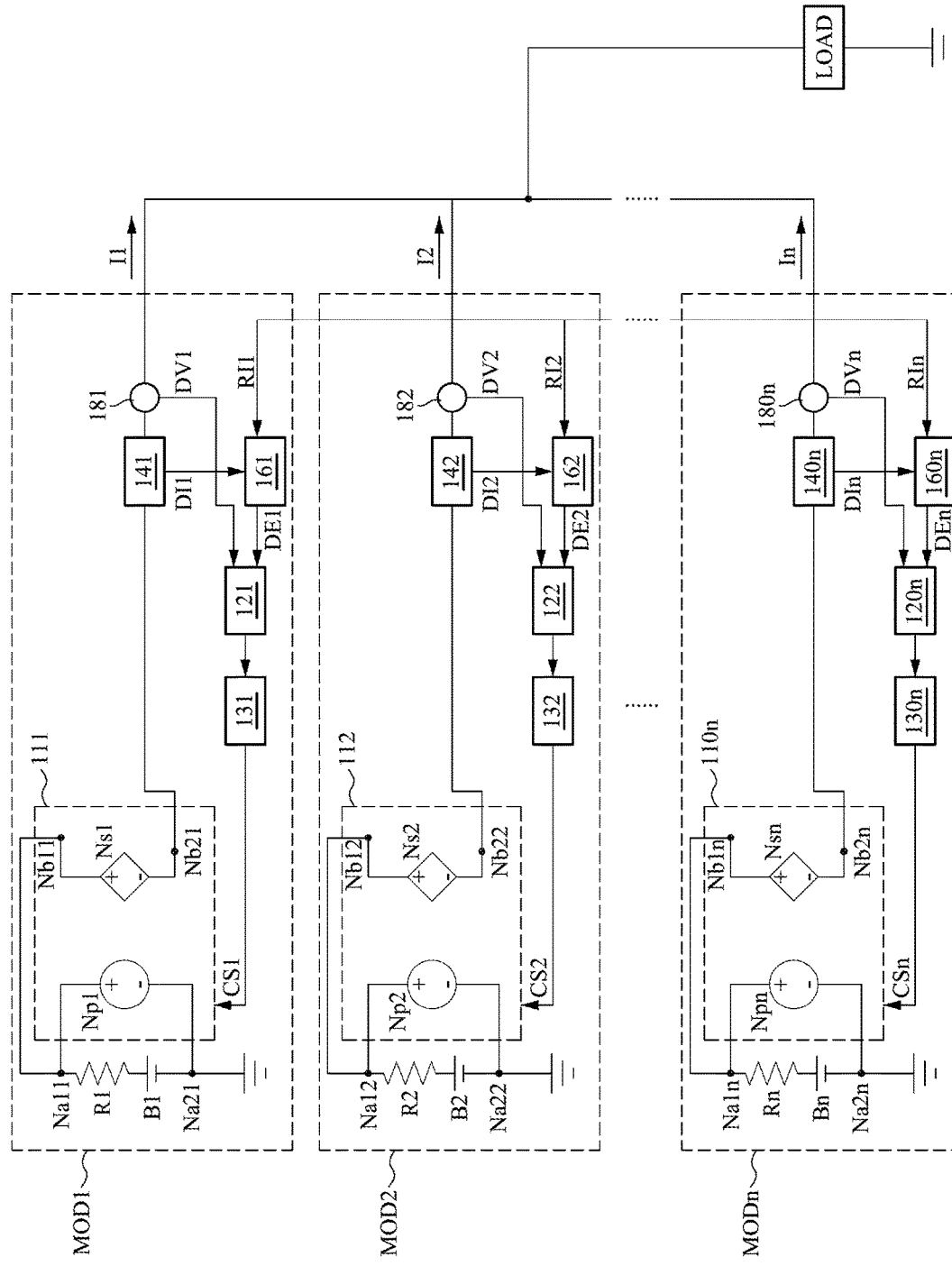
FIGS. 4 to 7 are schematic diagrams respectively illustrating another power supply system according to some embodiments of the present disclosure.

Please refer to FIG. 4. FIG. 4 is a schematic diagram respectively illustrating another power supply system 100b according to some embodiments of the present disclosure. In the embodiment shown in FIG. 4, elements similar to those in the embodiments of FIG. 1, FIG. 2A and FIG. 2B are denoted by the same element symbols, and their operations have been described in the previous paragraphs, and thus are not repeated here. In this embodiment, the converters 111-110n are configured to provide negative voltage compensation for the output voltages of the respective power conversion devices MOD1-MODn. For the specific circuit architecture, refer to FIG. 2B.

As shown in FIG. 2B, the converter 111 still uses the flyback converter as an example. Structurally, the first terminal of the secondary winding Ns1 is connected to the anode end of the diode D1. The cathode terminal of the diode D1 is connected to the node Na11 via the node Nb11 (that is, the positive terminal of the power supply B1). The second terminal of the secondary winding Ns1 is connected to the load LOAD via the node Nb21. The capacitor C1 is connected between the node Nb11 and the node Nb21. In this embodiment, the positive potential of the second voltage is at the node Nb11 and the secondary winding Ns1 is connected to the power supply B1 in series via the nodes Nb11 and Na11, so that the second voltage can be used as a negative voltage compensation for the output voltage. In other words, the output voltage provided by the power conversion device MOD1b may be less than or equal to the first voltage provided by the power supply B1.

Figure 5:
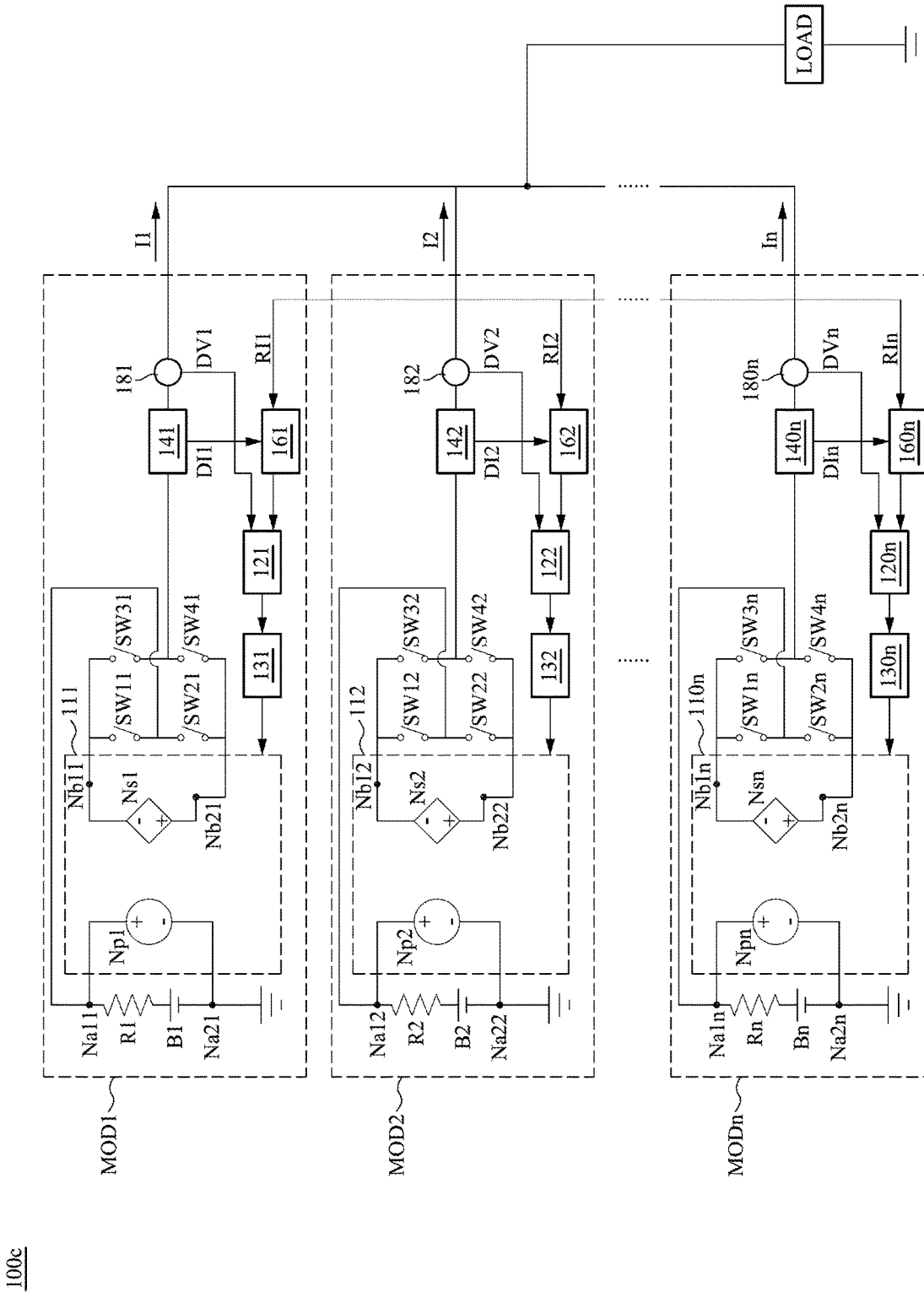

Please refer to FIG. 5. FIG. 5 is a schematic diagram respectively illustrating another power supply system 100c according to some embodiments of the present disclosure. In the embodiment shown in FIG. 5, elements similar to those in the embodiments of FIG. 1, FIG. 2A, FIG. 2B and FIG. 4 are denoted by the same element symbols, and their operations have been described in the previous paragraphs, and thus are not repeated here. The embodiment of FIG. 5 is a further modification of the architecture of FIG. 1, and at least one of the power conversion devices MOD1-MODn further includes a set of full-bridge circuits. In this embodiment, all power conversion devices MOD1-MODn include a full-bridge circuit as an example, but the present application is not limited thereto. As shown in FIG. 5, the full-bridge circuit is coupled to the secondary windings Ns1-Nsn of the transformer (not shown) of each converter 111-110n.

Taking the power conversion device MOD1 as an example, the full-bridge circuit includes a switch SW11, a switch SW21, a switch SW31 and a switch SW41. The first terminal of the switch SW11 is coupled to the node Nb11 (i.e., the first terminal of the secondary winding Ns1). The second terminal of the switch SW11 is coupled to the node Na11. The first terminal of the switch SW21 is coupled to the node Na11. The second terminal of the switch SW21 is coupled to the node Nb21 (i.e., the second terminal of the secondary winding Ns1). The first terminal of the switch SW31 is coupled to the node Nb11 (i.e., the first terminal of the secondary winding Ns1). The second terminal of the switch SW31 is coupled to the load LOAD. The first terminal of the switch SW41 is coupled to the load LOAD. The second terminal of the switch SW41 is coupled to the node Nb21 (i.e., the second terminal of the secondary winding Ns1).

In operation, when the positive voltage compensation is to be performed, the switches SW11 and SW41 are closed (i.e., turned on), and the switches SW21 and S31 are opened (i.e., turned off). On the other hand, when the negative voltage compensation is to be performed, the switches SW21 and S31 are closed (i.e., turned on), and the switches SW11 and SW41 are opened (i.e., turned off). In this way, by adding a full-bridge circuit, it is possible to realize the compensation of positive voltage or negative voltage with a single topology. Similarly, a full-bridge circuit can also be added to the architecture of FIG. 4 to implement a single topology for positive or negative voltage compensation. The specific details are similar to those described above, and thus are not repeated here.

Figure 6:
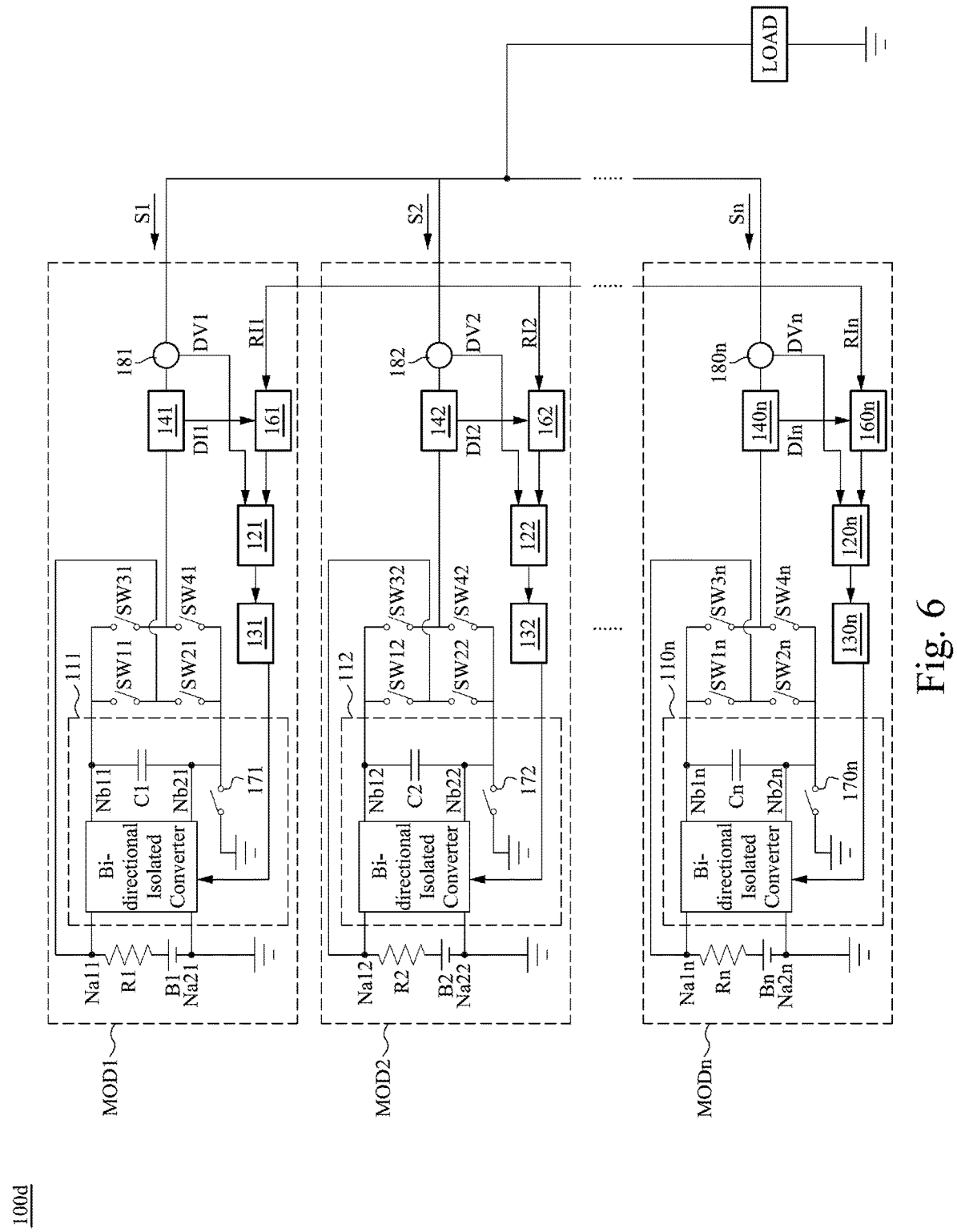

Please refer to FIG. 6. FIG. 6 is a schematic diagram respectively illustrating another power supply system 100d according to some embodiments of the present disclosure. In the embodiment shown in FIG. 6, elements similar to those in the embodiments of FIG. 1, FIG. 2A, FIG. 2B, FIG. 4 and FIG. 5 are denoted by the same element symbols, and their operations have been described in the previous paragraphs, and thus are not repeated here. Compared to the embodiment of FIG. 5, in the embodiment of FIG. 6, the converters 111-110n in each power conversion device MOD1-MODn are based on a bi-directional isolated converter for implementation.

In this embodiment, the power conversion devices MOD1-MODn further include switches 171-170n, respectively. The converters 111-110n are configured to receive the second current S1-Sn from the load LOAD to charge the power supplies B1-Bn, respectively. Specifically, taking the power conversion device MOD1 as an example, one end of the switch 171 is connected to the node Nb21 (that is, the second terminal of the secondary winding), and the other end thereof is grounded. When the power supply B1 is to be charged, the switch SW31 and the switch 171 will be closed (i.e., turned on), and the switch SW11, the switch SW21 and the switch SW41 will be opened (i.e., turned off). In this way, the converter 111 can receive the energy from the load LOAD, and adjust the output voltage according to the demand of the power supply B1.

Figure 7:
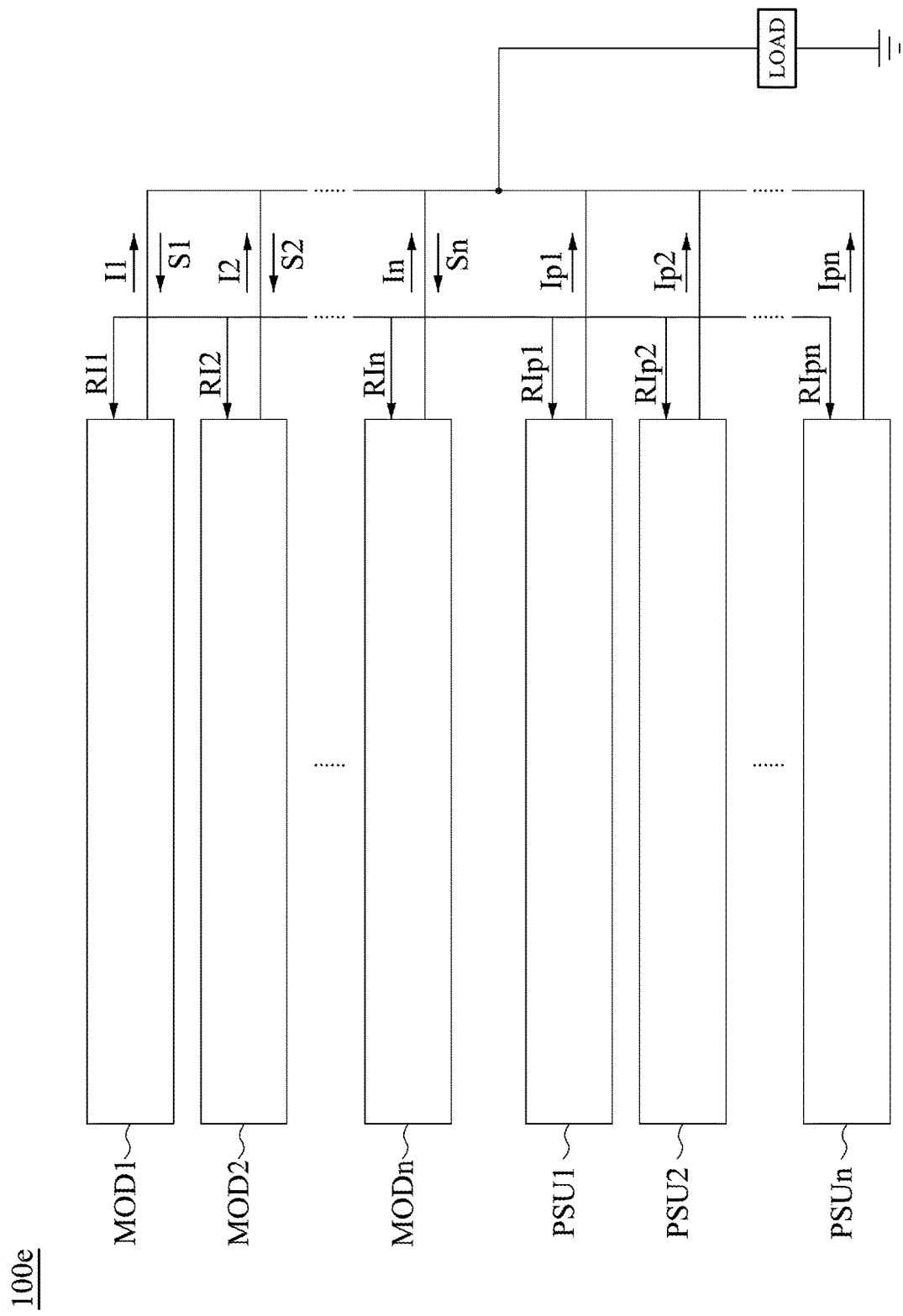

Please refer to FIG. 7. FIG. 7 is a schematic diagram respectively illustrating another power supply system 100e according to some embodiments of the present disclosure. In the embodiment of FIG. 7, the power supply system 100e includes power conversion devices MOD1-MODn and power supply modules PSU1-PSUn. The power conversion devices MOD1-MODn and the power supply modules PSU1-PSUn are all connected in parallel with each other, and are all electrically connected to the load LOAD. Each of the power conversion devices MOD1-MODn can be implemented by any one of the power conversion devices shown in FIG. 1, FIG. 4, FIG. 5 and FIG. 6. In other words, the power conversion devices MOD1-MODn are configured to output the first current I1-In according to the reference current signals RI1-RIn or to receive the second current S1-Sn respectively.

In addition, the power supply modules PSU1-PSUn are configured to provide the third currents Ip1-Ipn according to the reference current signals RIp1-RIpn, respectively. In some embodiments, each of the reference current signals RI1-RIn and the reference current signals RIp1-RIpn may be the current sharing calculation result of the first currents I1-In and the third currents Ip1-Ipn. Each power conversion device MOD1-MODn and each power supply module PSU1-PSUn use the corresponding current sharing calculation result as a reference to control the first or third current output to the load LOAD to achieve current sharing.

In some other embodiments, each of the reference current signals RI1-RIn may be the current sharing calculation result of the third currents Ip1-Ipn. The power supply modules PSU1-PSUn provide the third currents Ip1-Ipn to the load LOAD and the power conversion devices MOD1-MODn according to the corresponding reference current signals RIp1-RIpn, so that the power conversion devices MOD1-MODn receive the respective second currents S1-Sn for charging.

In other words, the power supply system 100e can implement positive voltage compensation, negative voltage compensation, and/or charge and discharge functions under a single topology, and can be used in parallel with other power supply modules.

It is worth noting that although the power supply system 100a, 100b, 100c, 100d and 100e shows a load LOAD, n power conversion devices MOD1-MODn and n power supply modules PSU1-PSUn, where n is a positive integer, these numbers are only examples for convenience of description, and are not intended to limit the disclosure. In some other embodiments, the power supply system may also include multiple loads. In addition, those skilled in the art can set the respective numbers of power conversion devices and power supply modules in the power supply system according to actual needs.

It should be noted that, as long as there is no conflict, the various drawings, embodiments, and features and circuits in the present disclosure may be combined with each other. The circuits shown in the drawings are for illustrative purposes only, and are simplified to make the description concise and easy to understand, and are not intended to limit the present application. In addition, the various devices, units and components in the above embodiments may be implemented by various types of digital or analog circuits, or may be implemented by different integrated circuit chips, or integrated into a single chip. The above is only an example, and the disclosure is not limited thereto.

In summary, in the above embodiments, the power supplies B1-Bn are respectively electrically connected in series to the secondary sides Ns1-Nsn of the converters 111-110n, so that the converters 111-110n only need to convert the voltage difference between the supply voltage of B1-Bn and the target output voltage, the present disclosure can reduce the cost of components, reduce the size of finished products, improve the conversion efficiency, alleviate the problem of overheating, and effectively extend the overall discharge time. In addition, the power supply system of the present application can be applied to DC power supplies with different internal resistances and different aging degrees, and can be compatible with other power supply modules or backup devices.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A power conversion device for providing an output voltage to a load, the power conversion device comprising:
   a power supply configured to provide a first voltage;
   a converter, comprising:
   a switch; and
   a transformer, comprising:
   a primary winding connected to the switch in series and configured to receive the first voltage, wherein the primary winding and the switch are connected with the power supply in parallel; and
   a secondary winding connected with the power supply and the load in series;
   wherein the switch is configured to switch according to a control signal, so that the secondary winding generates a second voltage according to a voltage of the primary winding;
   wherein the second voltage generated by the secondary winding together with the first voltage of the power supply are superposed as the output voltage.

2. The power conversion device of claim 1, further comprising a control circuit configured to generate the control signal according to a current detection signal corresponding to an output current provided by the power conversion device and a reference current signal to adjust the second voltage.

3. The power conversion device of claim 2, further comprising a current detection circuit electrically connected to an output terminal of the secondary winding, wherein the current detection circuit is configured to detect a current of the output terminal of the secondary winding, and to generate the current detection signal to the control circuit.

4. The power conversion device of claim 2, further comprising a voltage detection circuit electrically connected to an output terminal of the secondary winding, wherein the voltage detection circuit is configured to detect a voltage of the output terminal of the secondary winding, and to generate a voltage detection signal to the control circuit.

5. The power conversion device of claim 4, wherein the control circuit comprises:
   a current sharing circuit configured to generate a current difference according to the current detection signal and the reference current signal;
   a compensator configured to generate a compensation signal based on the current difference and the voltage detection signal; and
   a controller configured to generate the control signal according to the compensation signal.

6. The power conversion device of claim 2, further comprising a full-bridge circuit, wherein the full-bridge circuit comprises:
   a first switch, wherein a first terminal of the first switch is electrically connected to a first terminal of the secondary winding, and a second terminal of the first switch is electrically connected to a first terminal of the power supply;
   a second switch, wherein a first terminal of the second switch is electrically connected to the first terminal of the power supply, and a second terminal of the second switch is electrically connected to a second terminal of the secondary winding;
   a third switch, wherein a first terminal of the third switch is electrically connected to the first terminal of the secondary winding, and a second terminal of the third switch is electrically connected to the load; and
   a fourth switch, wherein a first terminal of the fourth switch is electrically connected to the load, and a second terminal of the fourth switch is electrically connected to the second terminal of the secondary winding.

7. The power conversion device of claim 6, wherein the control circuit turns on the first switch and the fourth switch, and turns off the second switch and the third switch, so that the second voltage is used as a positive voltage compensation.

8. The power conversion device of claim 6, wherein the control circuit turns off the first switch and the fourth switch, and turns on the second switch and the third switch, so that the second voltage is used as a negative voltage compensation.

9. The power conversion device of claim 6, wherein the converter is a bidirectional converter, and the power conversion device further comprises a fifth switch, wherein a first terminal of the fifth switch is electrically connected to the second terminal of the secondary winding, and a second terminal of the fifth switch is grounded.

10. The power conversion device of claim 9, wherein the control circuit turns on the third switch and the fifth switch, and turns off the first switch, the second switch and the fourth switch, so that the converter receives energy from the load to charge the power supply.

11. The power conversion device of claim 1, wherein the converter further comprises:
   a diode, comprising:
      an anode terminal electrically connected to the secondary winding; and
      a cathode terminal, electrically connected to the power supply; and
   a capacitor, including:
      a first terminal electrically connected to the cathode terminal; and
      a second terminal electrically connected to the load.

12. The power conversion device of claim 1, wherein the converter further includes:
   a diode, comprising:
      an anode terminal electrically connected to the secondary winding; and
      a cathode terminal, electrically connected to the load; and
   a capacitor, comprising:
      a first terminal electrically connected to the cathode terminal; and
      a second terminal electrically connected to the power supply.

13. A power supply system including a plurality of power conversion devices for providing an output voltage and an output current to a load, wherein each of the plurality of power conversion devices comprises:
   a power supply configured to provide a first voltage;
   a converter, comprising:
   a switch; and
   a transformer, comprising:
   a primary winding connected to the switch in series and configured to receive the first voltage, wherein the primary winding and the switch are connected with the power supply in parallel; and
   a secondary winding connected with the power supply and the load in series;

wherein the switch is configured to switch according to a control signal, so that the secondary winding generates a second voltage according to a voltage of the primary winding;

a control circuit configured to generate the control signal according to a current detection signal and a reference current signal corresponding to the output current so as to control the switch to adjust the second voltage, so that the output voltages of the plurality of power conversion devices are equal, wherein the second voltage generated by the secondary winding together with the first voltage of the power supply are superposed as the output voltage.

14. The power supply system of claim 13, wherein the reference current signal is an average value of the output currents of the plurality of power conversion devices.

15. The power supply system of claim 13, further comprising a voltage detection circuit configured to detect a voltage of an output terminal of the secondary winding to generate a voltage detection signal to the control circuit.

16. The power supply system of claim 15, wherein the control circuit generates a current difference according to the current detection signal and the reference current signal, generates a compensation signal according to the current difference and the voltage detection signal, and generates the control signal according to the compensation signal.

17. The power supply system of claim 13, wherein at least one of the power conversion devices comprises a full-bridge circuit, and the full-bridge circuit comprises:

a first switch, a first terminal of the first switch is coupled to a first terminal of the secondary winding, and a second terminal of the first switch is coupled to a first terminal of the power supply;

a second switch, a first terminal of the second switch is coupled to the first terminal of the power supply, and a second terminal of the second switch is coupled to a second terminal of the secondary winding;

a third switch, a first terminal of the third switch is coupled to the first terminal of the secondary winding, and a second terminal of the third switch is coupled to the load; and a fourth switch, a first terminal of the fourth switch is coupled to the load, and a second terminal of the fourth switch is coupled to the second terminal of the secondary winding.

18. The power supply system of claim 17, wherein the converter of the at least one of the power conversion devices is a bidirectional converter, and the at least one of the power conversion devices further comprises a fifth switch, wherein a first terminal of the fifth switch is electrically connected to the second terminal of the secondary winding, and a second terminal of the fifth switch is grounded.

19. The power supply system of claim 18, wherein the control circuit turns on the third switch and the fifth switch, and turns off the first switch, the second switch and the fourth switch, so that the converter receives energy from the load to charge the power supply.

20. The power supply system of claim 13, further comprising a power supply module for receiving the reference current signal and outputting a third current to the load, wherein the reference current signal is an average value of the output currents and the third current of the power conversion devices.

* * * * *